(12) United States Patent
Finn

(10) Patent No.: US 7,889,681 B2
(45) Date of Patent: Feb. 15, 2011

(54) METHODS AND DEVICES FOR IMPROVING THE MULTIPLE SPANNING TREE PROTOCOL

(75) Inventor: Norman Finn, Livermore, CA (US)

(73) Assignee: Cisco Technology, Inc., San Jose, CA (US)

(*) Notice: Subject to any disclaimer, the term of this patent is extended or adjusted under 35 U.S.C. 154(b) by 1553 days.

(21) Appl. No.: 11/182,564

(22) Filed: Jul. 14, 2005

(65) Prior Publication Data

US 2006/0198323 A1 Sep. 7, 2006

Related U.S. Application Data

(60) Provisional application No. 60/658,804, filed on Mar. 3, 2005, provisional application No. 60/661,279, filed on Mar. 11, 2005.

(51) Int. Cl.
H04L 12/28 (2006.01)

(52) U.S. Cl. ........................ 370/256; 370/255

(58) Field of Classification Search ................ 370/256
See application file for complete search history.

(56) References Cited

U.S. PATENT DOCUMENTS

| | | | |
|---|---|---|---|
| 3,855,422 A * | 12/1974 | Cadiou et al. ............... | 370/470 |
| 4,706,080 A | 11/1987 | Sincoskie | |
| 4,926,375 A * | 5/1990 | Mercer et al. ............... | 709/201 |
| 5,195,086 A * | 3/1993 | Baumgartner et al. ....... | 370/264 |
| 5,303,233 A * | 4/1994 | Sugawara .................... | 370/399 |
| 5,360,005 A | 11/1994 | Wilk | |
| 5,506,838 A * | 4/1996 | Flanagan .................... | 370/258 |
| 5,742,604 A | 4/1998 | Edsall et al. | |
| 5,959,968 A | 9/1999 | Chin et al. | |
| 5,959,989 A | 9/1999 | Gleeson et al. | |
| 6,035,105 A | 3/2000 | McCloghrie et al. | |
| 6,049,834 A | 4/2000 | Khabardar et al. | |
| 6,163,543 A | 12/2000 | Chin et al. | |
| 6,219,699 B1 | 4/2001 | McCloghrie et al. | |
| 6,298,061 B1 | 10/2001 | Chin et al. | |
| 6,304,901 B1 | 10/2001 | McCloghrie et al. | |
| 6,411,628 B1 * | 6/2002 | Hauck et al. ................ | 370/447 |
| 6,533,736 B1 | 3/2003 | Moore | |
| 6,694,034 B2 | 2/2004 | Julstrom et al. | |
| 6,714,563 B1 * | 3/2004 | Kushi .......................... | 370/503 |

(Continued)

OTHER PUBLICATIONS

PCT Search Report mailed Sep. 20, 2007, from International Application No. PCT/US06/05982, including Notification of Transmittal (3 pp.).

(Continued)

*Primary Examiner*—Daniel J Ryman
*Assistant Examiner*—Andrew Oh
(74) *Attorney, Agent, or Firm*—Weaver Austin Villeneuve & Sampson LLP

(57) ABSTRACT

The present invention provides improved unicast routing, multicast routing and unicast load sharing as compared with conventional methods. Preferred implementations of the invention provide improvements to IEEE 802.1Q. According to preferred aspects of the invention, each bridge is the root of its own multiple spanning tree instance ("MSTI"). Preferred implementations of the invention require no learning of media access control ("MAC") addresses on the backbone of a network. Some methods of the invention can resolve spanning tree asymmetries. Preferred implementations of the invention require a very low computational load for control protocols.

16 Claims, 12 Drawing Sheets

U.S. PATENT DOCUMENTS

| | | | |
|---|---|---|---|
| 6,728,205 B1 * | 4/2004 | Finn et al. | 370/217 |
| 6,813,250 B1 | 11/2004 | Fine et al. | |
| 6,879,695 B2 | 4/2005 | Maltan et al. | |
| 6,889,254 B1 * | 5/2005 | Chandra et al. | 709/224 |
| 6,937,576 B1 * | 8/2005 | Di Benedetto et al. | 370/256 |
| 6,952,483 B2 | 10/2005 | Boesen et al. | |
| D518,179 S | 3/2006 | Holmes | |
| 7,177,946 B1 * | 2/2007 | Kaluve et al. | 709/242 |
| 7,352,765 B2 * | 4/2008 | Dai et al. | 370/424 |
| 2002/0046271 A1 * | 4/2002 | Huang | 709/223 |
| 2002/0154606 A1 * | 10/2002 | Duncan et al. | 370/256 |
| 2002/0176373 A1 * | 11/2002 | Sato | 370/254 |
| 2004/0047300 A1 * | 3/2004 | Enomoto et al. | 370/256 |
| 2004/0264458 A1 | 12/2004 | Six | |
| 2005/0008175 A1 | 1/2005 | Hagen et al. | |
| 2005/0013260 A1 * | 1/2005 | Ramanathan et al. | 370/256 |
| 2005/0100182 A1 | 5/2005 | Sykes et al. | |
| 2005/0249372 A1 | 11/2005 | Barthel | |
| 2006/0013212 A1 * | 1/2006 | Singh et al. | 370/389 |
| 2006/0018496 A1 | 1/2006 | Niederdrank et al. | |
| 2006/0098589 A1 | 5/2006 | Kreeger et al. | |
| 2007/0064628 A1 * | 3/2007 | Tallet et al. | 370/256 |

OTHER PUBLICATIONS

Written Opinion of the International Searching Authority mailed Sep. 20, 2007, from International Application No. PCT/US06/05982, (5 pp.).

PCT Corrected International Search Report and Written Opinion mailed Mar. 26, 2009 in Application No. PCT/US06/05982 [P438WO].

*IEEE Standards for Local and Metropolitan Area Networks, Virtual Bridged Local Area Networks*, IEEE Std. 802.1Q, 2003 Edition, Institute of Electrical and Electronics Engineers, Inc., May 7, 2003, 368 pages.

*IEEE Standard for Local and Metropolitan Area Networks Media Access Control (MAC) Bridges*, IEEE Std. 802.1D—2004, IEEE Computer Society, Jun. 9, 2004, 295 pages.

*Understanding Multiple Spanning Tree Protocol (802.1s)*, Document ID: 24248, Introduction Where to Use MST PVST+ Case Standard 802.1q Case, 12 pages, Apr. 17, 2007.

* cited by examiner

US 7,889,681 B2

METHODS AND DEVICES FOR IMPROVING THE MULTIPLE SPANNING TREE PROTOCOL

CROSS-REFERENCE TO RELATED APPLICATIONS

This application claims priority to U.S. Provisional Patent Application No. 60/658,804, filed Mar. 3, 2005 and U.S. Provisional Patent Application No. 60/661,279, filed Mar. 11, 2005, both of which are entitled "Optimal Bridging" and both of which are hereby incorporated by reference for all purposes.

BACKGROUND OF THE INVENTION

1. Field of the Invention

The present invention relates to communication networks. More particularly, the present invention relates to the use of protocols such as spanning tree protocol ("STP"), rapid spanning tree protocol ("RSTP") and multiple spanning tree protocol ("MSTP") in communication networks.

2. Description of the Related Art

FIG. 1 depicts simple network 100 that includes layer 2 Ethernet bridges conforming to IEEE Std.™ 802.1D-2004 (IEEE 802.1D) or IEEE Std. 802.1Q-2003 (IEEE 802.1Q) 105. In this example, there are 9 bridges A-I and three stations, 140-142, connected via 12 local area networks (LANS) 125, 130, and 150 (10 instances). The letters A-I are Bridge IDs. Lower letters (e.g., A) are "better" than higher letters (e.g., D), according to the convention of IEEE 802.1D or IEEE 802.1Q, which are hereby incorporated by reference for all purposes. Port path costs 110 are indicated for each LAN. This diagram assumes that all bridge ports attached to the same LAN have the same value configured for their port path cost, though this is not required either by IEEE 802.1D or by the present invention.

Bridges create a spanning tree over network 100 by exchanging protocol packets called Bridge Protocol Data Units (BPDUs). Using these packets, the protocol state machines implemented in each bridge select certain ports to be part of the active topology of the network and certain others to be blocked. (For the purposes of this invention, STP and RSTP are equivalent; in any context where STP is mentioned, RSTP is equally applicable.) The spanning tree is "spanning" in the sense that all LANs are connected. It is a "tree" in that there is exactly one path between any given pair of bridges or stations.

According to STP, one of the bridges of network 100 (in this example, bridge A) will be elected as the "Root Bridge". The tree is constructed by each bridge selecting the port that is closest to the Root Bridge as its "Root Port," where "closest" is defined as the path to the root bridge with the least numerical sum of root path costs for the bridge ports traversed. (Only ingress from a LAN to a bridge counts in this summation, not egress from a bridge to a LAN.) Where two or more paths have the same sum of port path costs, tiebreaker values are used. The tiebreaker values are Bridge IDs and Port IDs, as defined in IEEE 802.1D and IEEE 802.1Q. Bridge E selects from among three equal cost paths, thus breaking three potential spanning tree loops, by using the bridge IDs of the adjacent bridges to select port 117 as its root port, and to mark as "alternate ports" and block ports 115 and 120. (Although these terms can have different meanings when used by those of skill in the art, the terms "packet" and "frame" will sometimes be used interchangeably herein.)

Although STP provides for the orderly flow of packets, it does not allow for all LANs in a network to be used in an optimal fashion. There is never a path from any bridge or station in the network to the root that has a lower sum of path costs than the path along that root bridge's spanning tree, but paths between other pairs of bridges or stations may not be optimal. For example, if ports 115 and 120 are blocked, the path from station 142 to station 141 is 142-E-F-I-A-B-D-G-141, for a total cost of 11 (station 141 does not count the cost of the last hop), instead of the much shorter path 142-E-G-141, cost 3. It would be desirable to address this limitation of the prior art.

MSTP offers an improvement over STP in that multiple spanning trees are created. Network 100 could be configured to have up to 64 spanning trees. For example, each bridge A through I could be configured to be the Regional Root Bridge of a separate multiple spanning tree instance (MSTI). IEEE 802.1Q bases the determination of the MSTI to which a given frame is assigned, and over which that frame is forwarded, solely upon the frame's Virtual Local Area Network Identifier (VLAN ID or VID), which in turn, is based upon only a) which port the frame entered the network, and/or b) what higher-layer protocol the frame carries. VIDs can often be assigned to ports and/or protocols that result in the selection of suitable MSTIs. However, this is not always possible, since any given station connected to the network may converse with a number of other stations, and in turn, they with others. For example, in network 100, each station 140, 141, and 142 may converse with each other. It would be desirable to always be able transmit a frame along the most direct path to its destination in all cases.

SUMMARY OF THE INVENTION

The present invention provides improved unicast routing, multicast routing and unicast load sharing as compared with conventional methods. Preferred implementations of the invention provide improvements to IEEE 802.1Q. According to preferred aspects of the invention, each bridge is the root of its own spanning tree instance ("MSTI"). Some methods of the invention require no learning of media access control ("MAC") addresses on the backbone of a network. Some methods of the invention can resolve spanning tree asymmetries. Preferred implementations of the invention require a very low computational load for control protocols.

Some aspects of the invention provide a method for controlling a network. The method includes the steps of configuring each bridge in a region of the network as a root of a Multiple Spanning Tree Instance ("MSTI") and of sending unicast frames according to an MSTI having a receiving bridge as a root bridge. Multicast frames may be sent according to an MSTI having a sending bridge as a root bridge. Access ports may use simple Ethernet frames.

In some such implementations, the network may include a plurality of MAC-in-MAC translation units ("MTUs") and the unicast frames may be MAC-in-MAC frames. Each MAC-in-MAC frame may comprise a simple Ethernet frame encapsulated by an encapsulation layer having a bridge ID as a destination MAC address.

The method may also include these steps: receiving a simple Ethernet frame by a first MTU; encapsulating the simple Ethernet frame as a MAC-in-MAC frame that indicates at least a destination bridge ID and an MSTI; and forwarding the MAC-in-MAC frame according to the MSTI. The method may also include these steps: receiving the MAC-in-MAC frame by a second MTU; decapsulating the MACin-MAC frame to reveal the simple Ethernet frame; and sending the simple Ethernet frame to an access port.

The encapsulation layer may comprise a VLAN tag. The VLAN tag may indicate a root bridge of an MSTI. The VLAN tag may comprise a Root Part, a Multipath Part and a Domain Part.

A bridge may include more than 1 MAC-in-MAC translation unit ("MTU"), each MTU having a MAC address. If so, the method may include the step of sending an announcement packet advertising the MAC address of each of the bridge's MTUs.

Other methods of controlling a network are provided herein. One such method includes the steps of forming a field of a frame having one bit for each MSTI of a region and setting a bit of the field to "No" when the frame is passed through a port that is not a root port of any MSTI of the region. The method may also include the steps of receiving a frame having a bit of the field set to "No"; and applying a protocol to determine which bridge will select a new root port.

The methods described herein may be implemented in hardware, firmware or software. For example, some aspects of the invention may be implemented by one or more network devices in a communication network, e.g. as software for controlling one or more of the network devices. One such implementation of the invention provides a network that may be apportioned into a plurality of regions. The network comprises a plurality of bridges in a region of the network, each bridge configured as a root of a Multiple Spanning Tree Instance ("MSTI") and further configured to send unicast frames according to an MSTI having a receiving bridge as a root bridge.

Bridges of the network may be configured to form a field of a frame having one bit for each MSTI of the region. If so, each bridge may be further configured to set a bit of the field to "No" when the frame is passed through a port that is not a root port of any MSTI of the region.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Figure 1:
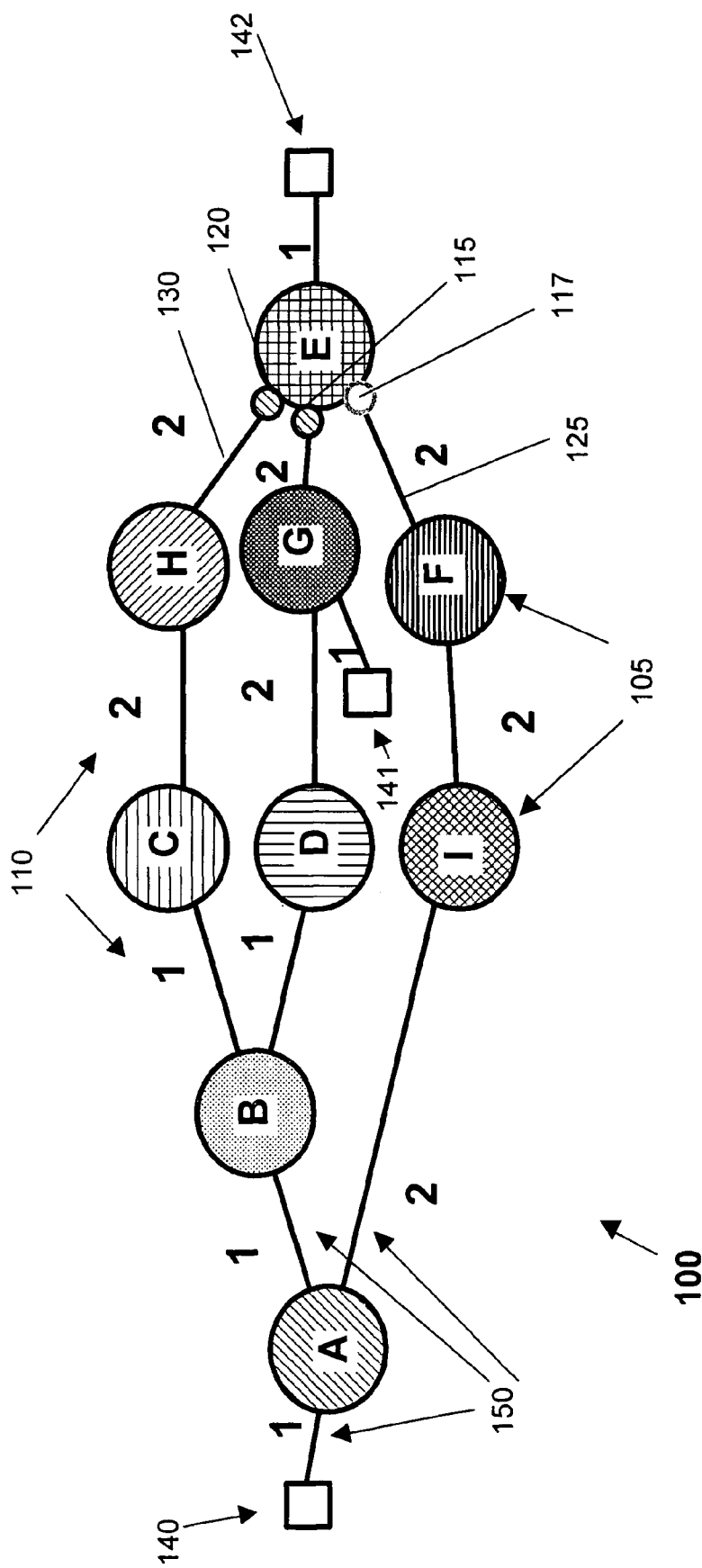
FIG. 1 illustrates the use of conventional STP.

According to preferred aspects of the invention, each bridge is the root of its own MSTI. For example, referring to the conventional 9-bridge network 100 of FIG. 1, there was a single MSTI having bridge A as the root. Referring to network 200 of FIGS. 2 and 3, preferred implementations of the invention create 9 spanning trees for a comparable 9-bridge network. Only two of these 9 spanning trees are shown in FIGS. 2 and 3: the one with bridge A as the root (FIG. 2) and the one with bridge E as the root (FIG. 3).

Figure 2:
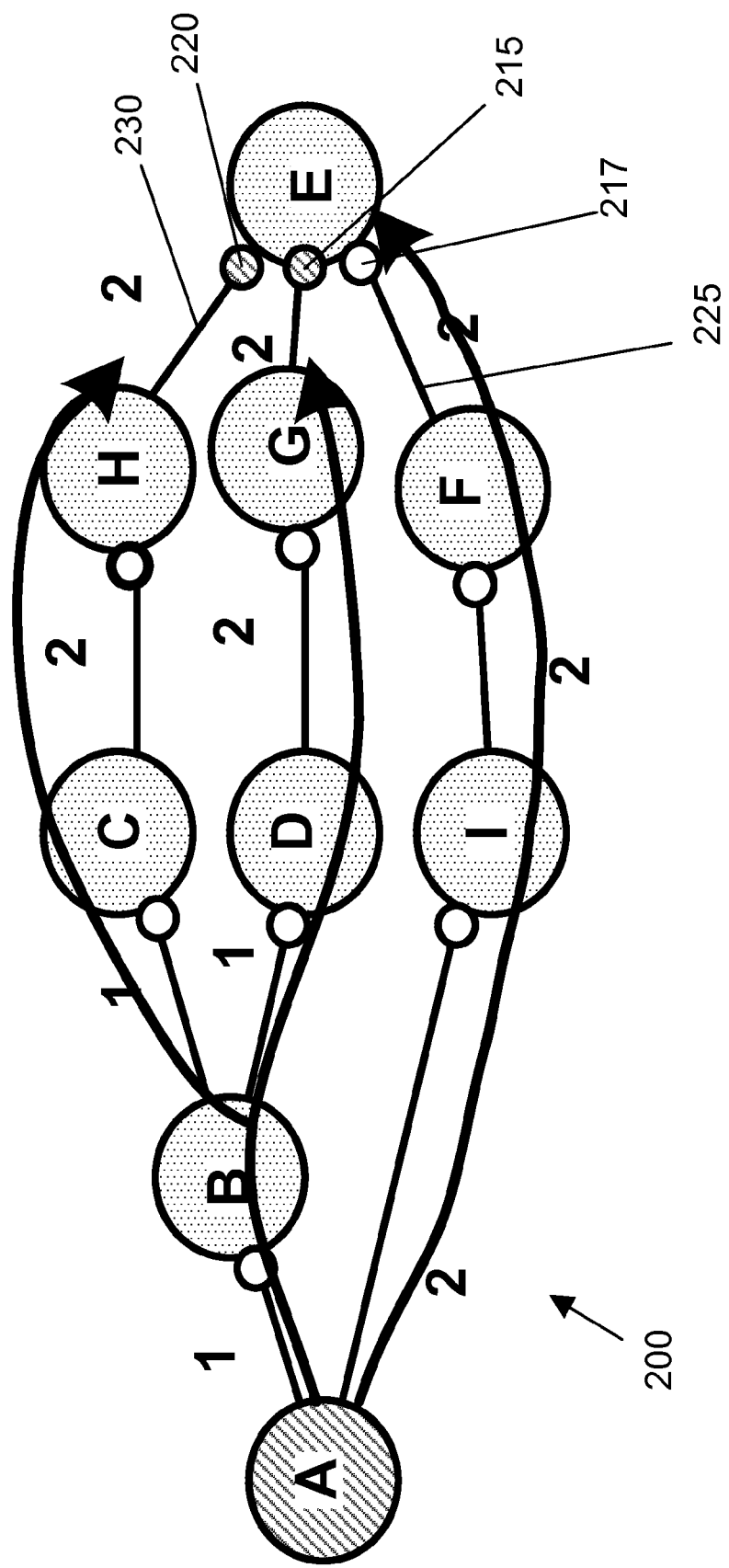
FIG. 2 illustrates an MSTI rooted in bridge A of network 200.

Like network 100, network 200 may be configured with an MSTI having bridge A as the root, as shown in FIG. 2. Such an MSTI will sometimes be identified herein according to the root bridge. For example, an MSTI having bridge A as the root will sometimes be referred to as "MSTI A" or the like. In preferred implementations of the invention, multicast traffic originating from bridge A travels along MSTI A. As will be apparent to those of skill in the art, as long as the port path cost for all bridge ports connected to a LAN are equal, there is no more optimal path between A and any other bridge or station than the path along MSTI A.

Figure 3:
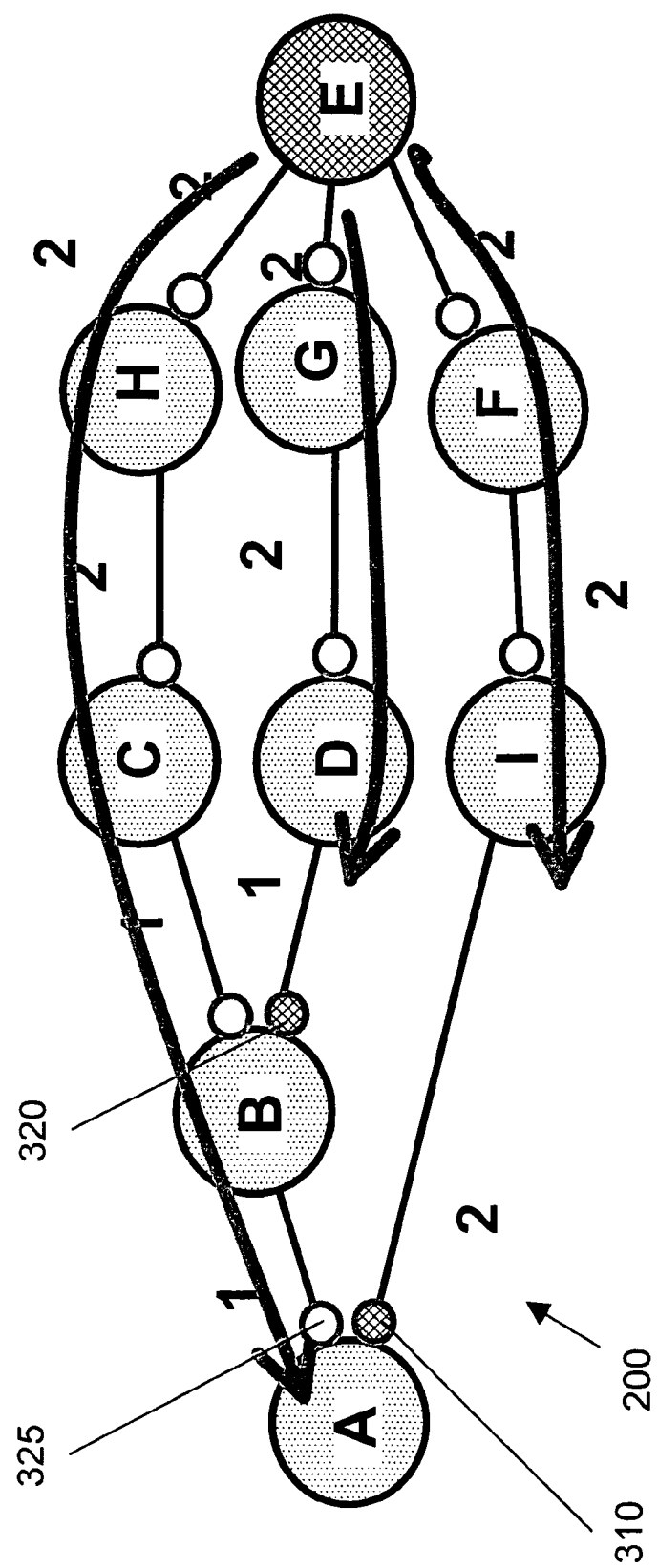
FIG. 3 illustrates an MSTI rooted in bridge D of network 200.

FIG. 3 illustrates another MSTI of network 200 having bridge E as the root. In this example, loops are prevented when bridge A block port 310 and having bridge B block port 320. All packets originating from bridge E travel along MSTI E.

Figure 5:
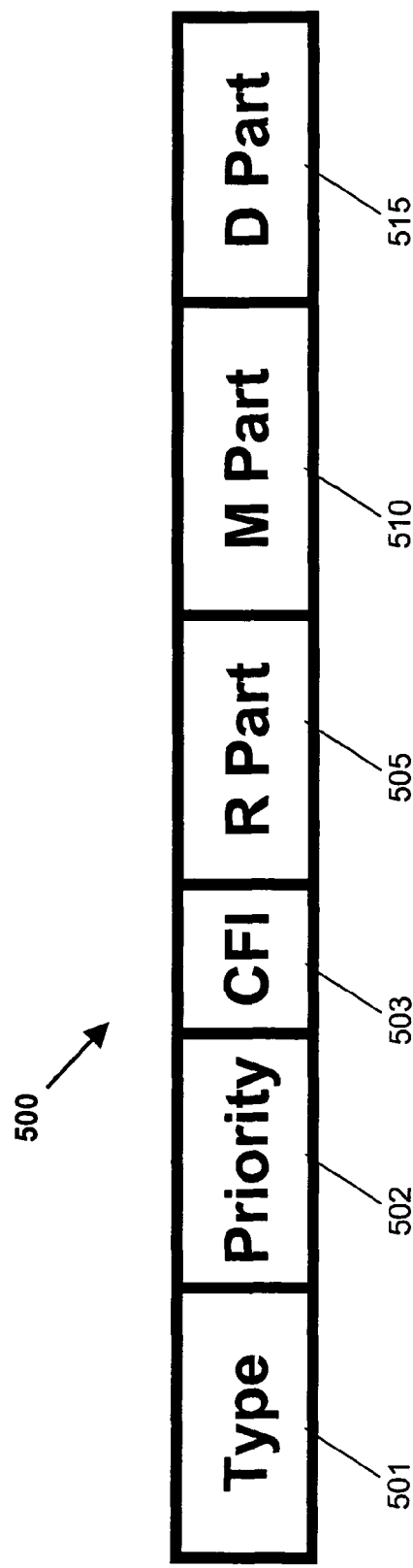
FIG. 5 illustrates an exemplary VLAN tag that may be used to implement some aspects of the invention.
Figure 6:
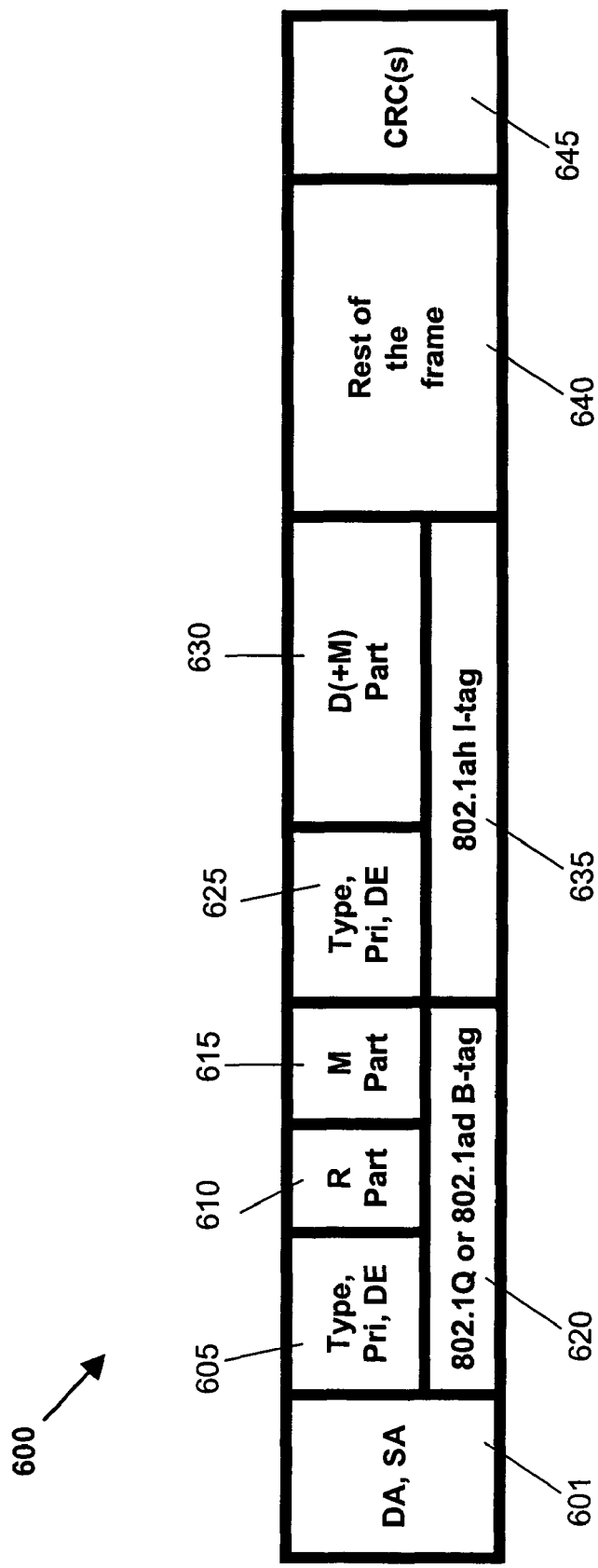
FIG. 6 illustrates another exemplary VLAN tag that may be used to implement some aspects of the invention.

FIG. 5 illustrates one example of a VLAN tag. VLAN tag 500 includes Root Part 505, Multipath Part 510 and Domain Part 515. In one implementation, the one shown in FIG. 5, VLAN Tags 500 is identical in format to the VLAN tag specified in IEEE 802.1Q. In FIG. 5, the Type Field 501, the Priority Field 502, and the Canonical Format Identifier Field 503 are exactly as specified in IEEE 802.1Q. The Root Part 505, Multipath Part 510 and Domain Part 515 together occupy the same bits as the VLAN ID (VID) field in IEEE 802.1Q. In other words, the IEEE 802.1Q VID field is subdivided into the Root Part 505, Multipath Part 510 and Domain Part 515. An alternative to the format of FIG. 5 is shown in FIG. 6.

If a frame with no VLAN tag 500 (an "untagged frame") is received by a bridge, that bridge assigns the frame a value for the Priority, CFI, Root Part 505, Multipath Part 510 and Domain Part 515 in the same manner as described in IEEE 802.1Q, with certain exceptions: Such untagged frames are typically received from stations connected to the bridge; frames from other bridges would already have a VLAN tag 500. Domain Part 515 of VLAN tag 500 is assigned in the same manner as the PVID (Port VLAN ID) of IEEE 802.1Q; it is typically a constant per bridge port, though it may be assigned based on both the bridge port and the Layer 3 protocol present in the frame. The Multipath Part 510 and Domain Part 515 are assigned based on other criteria. Once assigned by a bridge, Root Part 505, Multipath Part 510 or Domain Part 515 are used by the bridges in the network to forward the frame; these three values are not changed during the forwarding of the frame through the network.

A certain value of Root Part 505, e.g. 0, may optionally used to identify frames that have been assigned a Domain Part 515, perhaps by a VLAN-aware station such as a router or file server, but have not been assigned a Root Part 505 or a Multipath Part 510.

Root Part 505 specifies which Root Bridge is used when routing the frame. Root Part 505 is constant for each bridge. For example, when bridge E in network 200 receives an untagged frame, it places a value indicating "MSTI E" in Root Part 505 when it transmits that frame to another bridge in the network. Similarly, bridge G would place a value indicating "MSTI G" in Root Part 505 when transmitting a frame received without a VLAN tag 500, typically from a station connected directly to bridge G. Thus, by using Root Part 505 to indicate the Root Bridge, traffic between bridges G and E never use MSTI A, and thus can take the direct path between the two bridges G and E. Optimal routing thus is achieved.

Multipath Part 510 specifies which set of port path cost parameters is used when routing the frame. Spanning trees, like OSPF or IS-IS, are constructed by minimizing the sum of the "costs" of the ports into which a frame may pass into a bridge. Every MSTI with the same Multipath Part has the same port path cost structure. MSTIs with different Multipath Parts may have different port path costs. This allows one to specify alternate paths across the network for different flows.

When Multipath Part 510 is used in a network, each bridge is the Root Bridge of multiple MSTIs, one MSTI for each possible value of Multipath Part 510. The port path costs on a given bridge port are configured to have the same value for all of the different MSTIs having different Root Parts 505, but which share the same value of Multipath Part 510. The port path costs on a given bridge port may be, but need not be, different for different values of Multipath Part 510.

Multipath Part 510 may be not used, and thus not be present in the VLAN tag, in which case only one set of port path cost parameters is used for all Root Parts 505. If used, Multipath Part 510 may be determined by the Domain Part, and thus not actually be present in the VLAN tag, or may be a value determined by the source bridge, and be present in the VLAN tag. For examples, the Multipath Part 510 may be determined by the port on which the packet entered the source bridge, may be a function of the Layer 3 protocol carried in the packet, or may be a function of the contents of the frame, such as a hash of the IP address 5-tuple (IP Source, IP Destination, Layer 4 Protocol, Layer 4 source port, Layer 4 destination port). If Multipath Part 510 is chosen by a hash, that hash must be symmetrical with respect to source and destination. In such implementations, Multipath Part 510 tags every frame with the equivalent of an EtherChannel hash value.

In preferred implementations of the invention, R Part 505 and M Part 510, together, select the MSTI to be used for forwarding the frame. There are (number of M Parts)*(number of R Parts) separate MSTIs. The Root of each Bridge Protocol Data Unit ("BPDU") says, in effect, "This is the Root Port" for each MSTI Domain Part 515 specifies the broadcast domain (e.g., the IP Subnet). Domain Part 515 may be used to identify which LANs are allowed to receive the frame. In IEEE Std. 802.1Q-1998, the original VLAN standard, the VLAN tag had only this single function; there was only one Spanning Tree Instance.

Multipath Part 510 and Domain Part 515, together, determine the Filtering Database ID (FID) to use when learning or looking up a MAC address. Root Part 505 does not affect FID selection. (For example, Private VLANs map to the same FID.) Multiple Domain Part 515 values may map to the same FID. For the same Domain Part 515, multiple values of Multipath part 510 or Root Part 515 must map to different FIDs.

IEEE Std. 802.1Q MSTP combines Domain Part 515 and Multipath Part 510. This conflation of the Domain Part and the Multipath Part is a common complaint against MSTP, because MSTP can only divide the multiple routing paths along subnet boundaries. On the other hand, when this method of selecting the engineered path to use is satisfactory, no bits need be dedicated to the M-Part.

The Root Part 505, Multipath Part 510 and Domain Part 515 need not be independently encoded as separate bits in a VLAN tag 500. An alternative implementation may instead look up the 12-bit VLAN ID field of the IEEE 802.1Q tag in a table of 4094, 4095, or 4096 values (the VID values 0 and FFF are not legal for some purposes) to obtain values for Root Part 505, Multipath Part 510 and Domain Part 515. This could allow a network to have more values for the Root, Multipath or Domain Parts than would fit in 12 bits. For example, if a frame with Domain Part values 64 through 127 is never sourced from bridges B, C, D, or E, then the combination of Root Part=B through E and Domain Part 64 through 127 need not be present in the table, thus saving VID values to represent combinations that are used in the network.

Although VLAN tag 500 suggests that Root Part 505, Multipath Part 510 and Domain Part 515 are all the same size, this is not necessarily the optimal configuration. For example, some implementations divide up the 12 bits of an existing IEEE 802.1Q or new IEEE P802.1 ad tag into three parts. Such implementations maintain compatibility with existing forwarding hardware. However, 12 bits may not be enough to satisfactorily define all 3 parts, particularly R Part 505. Therefore, alternative implementations provide a new and larger VLAN tag.

Another implementation will now be described with reference to FIG. 6. This implementation expands the number of bits available for the R, M, and D Parts beyond the 12 bits allowed in IEEE 802.1Q. Frame 600 begins with source and destination MAC addresses, shown for the sake of simplicity here as a single field 601. Type/priority/DE field 605, R Part field 610 and M Part field 615 may be included in area 620, which is reserved for an IEEE 802.1Q or IEEE 802.1 ad B-tag. Type/priority/DE field 605 and D+M Part field 630 may be included in area 635, which is reserved for an I-tag according to the emerging IEEE 802.1ah standard. The remaining substantive fields of frame 600 are shown as an individual field 640, for the sake of simplicity. CRC field 645 follows.

According to the previously-described implementations, all frames are transmitted on the "source MSTI"; that is, the first bridge in the network to receive an untagged frame supplies a value for the Root Part 505 that identifies an MSTI of which that bridge is the root bridge. There is a problem, however, in that MAC address learning cannot work properly.

Figure 7A:
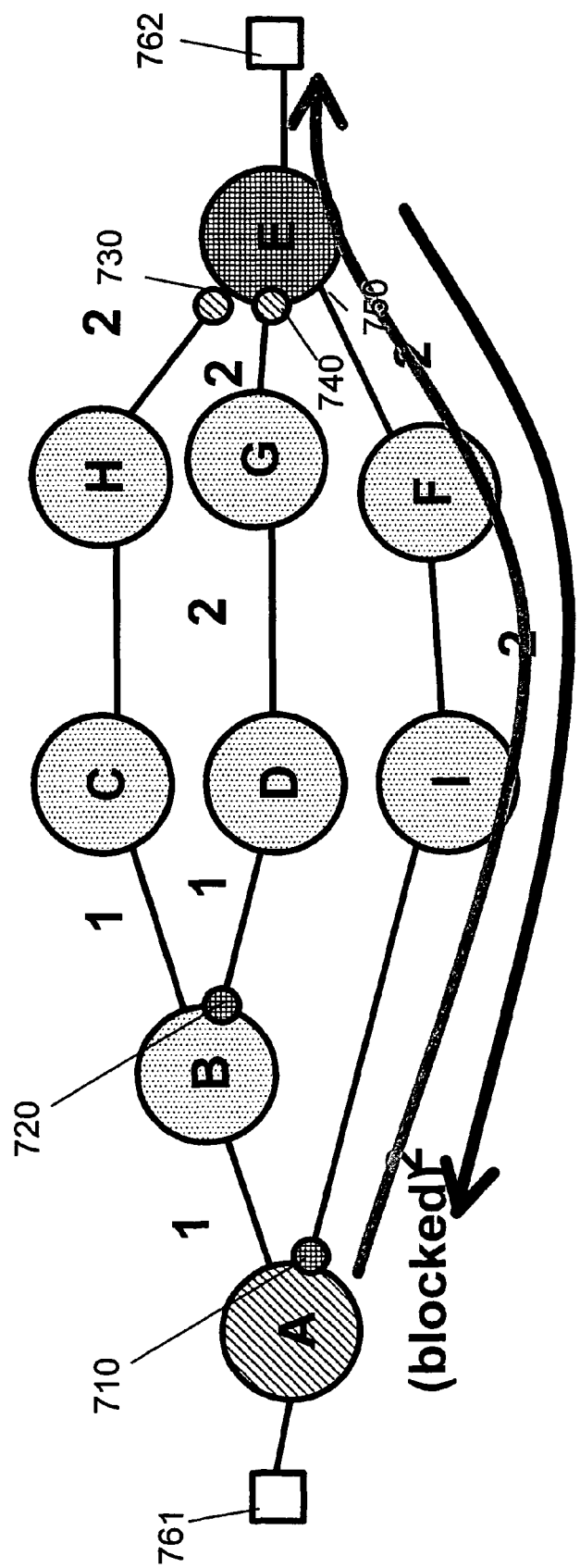
FIG. 7A is a network diagram that illustrates the problem of asymmetrical MSTIs.

The underlying problem will be described in more detail with reference to FIG. 7A et seq. Suppose the VLANs rooted on Bridges A and E are blocked as shown. MSTI E is implemented by having bridge A block port 710 and by having bridge B block port 720. MSTI A is implemented by having bridge E block ports 730 and 740.

Suppose that A receives a frame from station 761 with a destination MAC address indicating station 762, and that none of the bridges A through I have that destination MAC address in their Filtering Databases. A marks the frame with a VLAN tag 500 that includes a Root Part 505 that specifies MSTI A. This frame is flooded throughout the network, including to bridge B via the LAN connecting B to F. B floods the frame to at least the port to which station 762 is attached. Typically, the frame's VLAN tag 500 is removed from the frame before it is transmitted on the LAN connecting to station 762. Until then, as this frame traverses the network, each bridge learns the frame's source MAC address. The MAC address and the FID are used as the key into the Filtering Database, and the port on which the frame was received is stored as the payload. Thus, each bridge learns that station 761 can be found in the direction of the root port for MSTI A.

When station 762 replies with a frame destined for station 761, this untagged frame is received by bridge E and marked with a Root Part 505 indicating MSTI E. MSTI A and MSTI E must share the same FID, so the learned MAC address of station 761 is found in the Filtering Database, and the port which is the root port for MSTI A is identified as the port on which the frame should be forwarded. It therefore follows the same path, but in the reverse direction, as that copy of the original frame that succeeded in reaching station 762 from station 761, namely though bridges F and I to bridge A.

However, when the frame finally reaches bridge A, at port 710, it is discarded, because MSTI E is blocked on that port. A two-way conversation cannot take place.

Figure 7B:
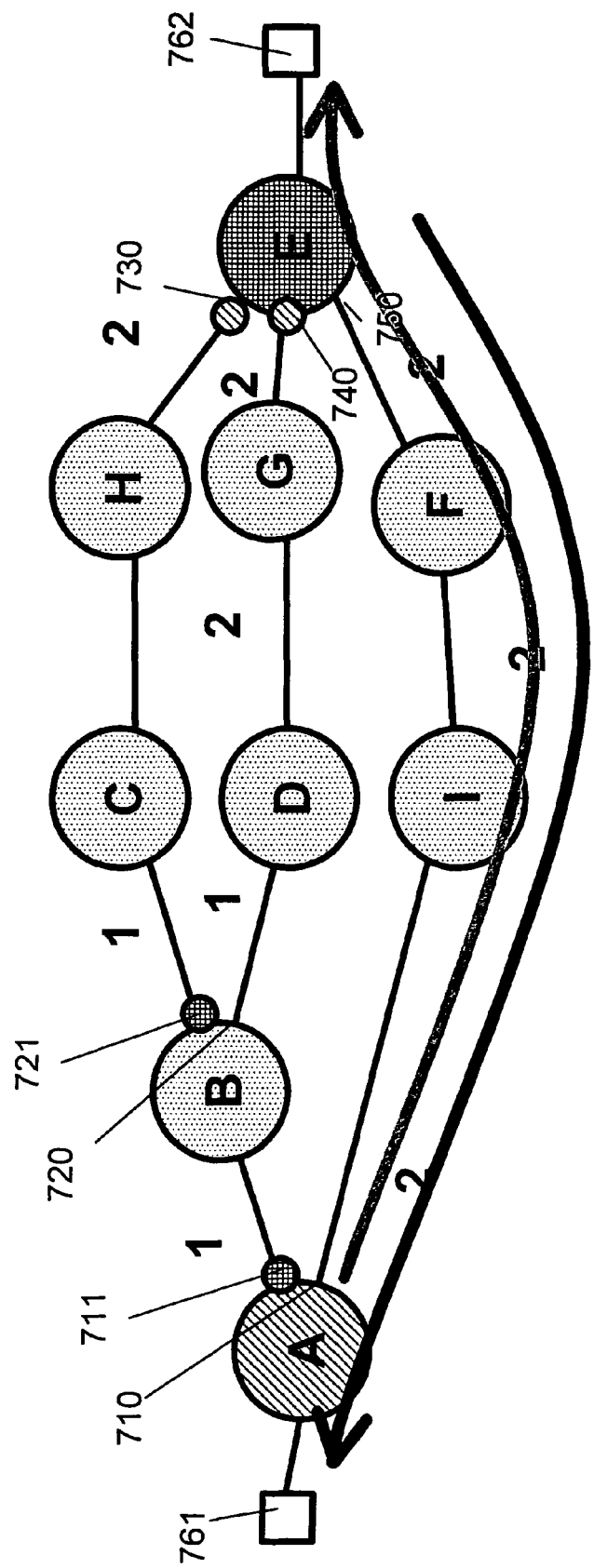
FIG. 7B is a network diagram that illustrates symmetrical MSTIs.

In order to avoid this situation, impasse, MSTP must be modified to ensure that the path from A to E via MSTI A passes through exactly the same bridges, in reverse order, as the path from E to A via MSTI E. In FIG. 7B, Bridge A blocks port 711, instead of port 710, and bridge B blocks port 721, instead of port 720. In the network shown in FIG. 7B, the paths between A and E on MSTIs A and E are symmetrical. The information learned on the frame from station 761 to station 762 can be used to successfully convey the frame from 762 to station 761. The difference in root port/alternate port selection between FIG. 7A and FIG. 7B is accomplished by modifying MSTP in two ways: Port path cost information and Reflection Vector information are added to the MSTP BPDUs.

Because port path costs can be configured, as well as computed from the LAN speed, the two bridges on the two (or more) ends of the LAN can disagree on the port path cost used in the STP algorithm. This makes the symmetrization process much more difficult.

Accordingly, preferred implementations of the invention ensure that 2 bridges connected by a LAN use the same port path cost for that L. In some such implementations, the bridge advertises the port path cost configured for each different Multipath Part in the BPDUs transmitted on that port. All bridges on a given LAN use, instead of their configured port path costs, the port path costs advertised by the Common and Internal Spanning Tree instance ("CIST") designated bridge, as described in IEEE 802.1Q. The CIST port path costs are not altered by this procedure. One port path cost parameter is required for each M-Part. In such implementations, a bridge's bridge priority as defined in IEEE 802.1Q must be the same in all MSTIs that that differ only in their Root Parts.

It has been observed often, in IEEE 802.1, that when a bridge has a number of non-designated ports from which to select its Root Port, any decision it is perfectly compatible with the spanning tree algorithms. Furthermore, as long as the port path costs are forced to be symmetrical by the CIST tie-breaker, the following is true: if any Bridge "X" has an equal-cost root port choice on MSTI Y, then Bridge Y has an equal-cost root port choice on MSTI X. Any such equal-cost paths are a potential source of the asymmetry shown in FIG. 7A. Non-equal costs paths are not a problem; because the port path costs are equal in both directions, the least-cost path for MSTI A will be the same as the least-cost path for MSTI B.

Since the both bridges know about the problem, they can do something about it. Accordingly, some preferred implementations of the invention add, for each MSTI in a BPDU, a Reflection Vector containing one bit of information about each of the other MSTIs. For convenience in describing the Reflection Vector, the MSTI to which the Reflection Vector is attached in the BPDU is the "Owning MSTI", and the MSTI for which a given bit in the Reflection Vector carries information is the "Bit MSTI". A bit in a Reflection Vector is set to "Yes" if, along the path from the Owning MSTI's Root Bridge, the bridge port from which the BPDU carrying this MSTI's information was transmitted was the Root Port for the Bit MSTI. Otherwise, the bit is set to "No".

Figure 8:
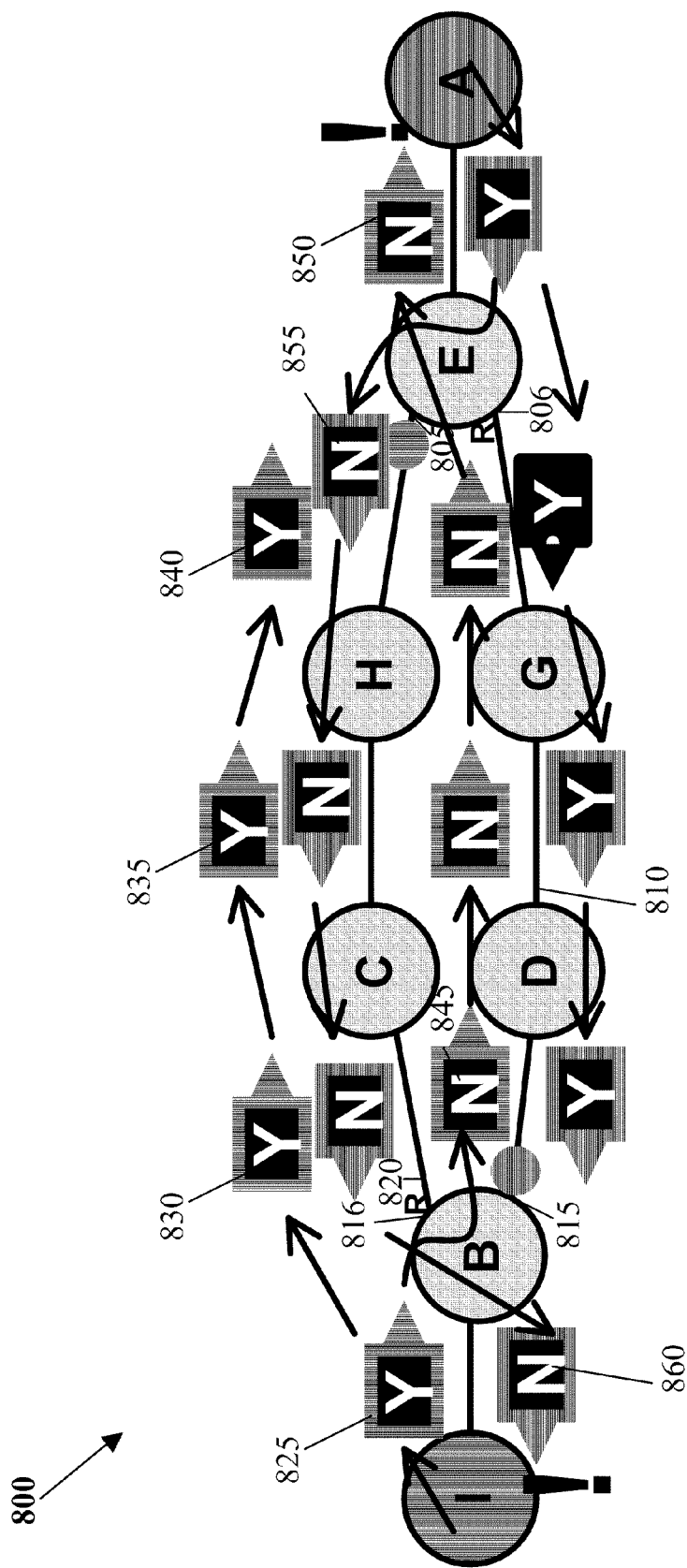
FIG. 8 is a network diagram that illustrates the use of reflection vectors according to some implementations of the invention.

Some implementations of the Reflection Vector will now be described with reference to FIGS. 8 through 10. Referring first to network 800 of FIG. 8, elements of network 800 that correspond to bridge A are shaded with relatively darker horizontal stripes and elements that correspond to bridge I are shaded with relatively lighter vertical stripes. Each box bears the pattern of the Owning MSTI. The letter inside each box shows the Bit MSTI, which is what the Reflection Vector of the BPDU indicates about the other Root's MSTI.

Looking at the Root Part values for bridges A and I, bridges B and E will each want to block one port for one of the two Root Parts' MSTIs. Here, bridge E has blocked port 805 to form MSTI 810 rooted in bridge I ("MSTI I"). Port 806 is now the Root Port. Similarly, bridge B has blocked port 815 to form MSTI 820 rooted in bridge A ("MSTI A"). Port 816 is now the Root Port.

When the Root Bridge of an MSTI initiates the Reflection Vector as a per-bridge per-MSTI variable, all of the other MSTIs' bits are Yes. For example, when bridge I initiates a Reflection Vector at stage 825, all of the other MSTIs' bits are Yes. The Reflection Vector received for a given Owner MSTI from the Regional Root Port of that MSTI is saved as per-bridge per-MSTI variable. Whenever an Owner MSTI's information, including the Reflection Vector, is transmitted in a BPDU on a bridge port that is a Designated Port for the Owner MSTI, the transmitted Reflection Vector is the per-bridge per-MSTI Reflection Vector, except that the bit in the transmitted Reflection Vector corresponding to each other Bit MSTI is reset to "No" if the port on which the BPDU is transmitted is not a Regional Root Port for that Bit MSTI. Accordingly, because path 820 corresponds with MSTI A, the Reflection Vector passes unchanged and remains set to Yes at stages 830, 835 and 840. This information is not stored in bridge E, however, because it is not received on the Regional Root Port for MSTI I; it is received on an Alternate Port for MSTI I.

When the Reflection Vector from the Root Port is transmitted on a port that is not an MSTI Regional Root Port on any MSTI, that MSTI's bit is set to "No" in the Reflection Vector, whatever its former value. This rule applies to the ports on the Root Bridge, as well. Accordingly, because port 815 of bridge B is not an MSTI Regional Root Port on MSTI A, MSTI A's bit is set to "No" in the Reflection Vector at stage 845. This BPDU is stored in bridge E, because port 806 is the Regional root Port for MSTI I. Therefore, it is the "No" that is transmitted to bridge A for Owner MSTI I, Bit MSTI A at stage 850.

Whenever a bridge receives a Reflection Vector from Owning MSTI 1 on a Regional Root Port or Regional Alternate Port for MSTI 1 such that the value for Bit MSTI 2 in that Reflection Vector does not equal the bit being transmitted by that bridge in the Reflection Vector for Owning MSTI 2, Bit MSTI 1, then if that port is a Designated Bridge for MSTI 2, the bridge knows that the two MSTIs 1 and 2 are not in synch, and that something needs to be done. Accordingly, at stages 850 and 840, bridges A and E, respectively, know that MSTI A and MSTI I are not in synch.

Similarly, because port 805 of bridge E is not an MSTI Regional Root Port on MSTI I, MSTI I's bit is set to "No" in MSTI A's Reflection Vector at stage 855. This BPDU reaches bridge B (at stage 820) because port 816 of bridge B is the Regional Root Port for MSTI A. Accordingly, at stage 860, bridge I also knows that MSTI A and MSTI I are not in synch. It will be appreciated by those of skill in the art that stage 860 could occur at approximately the same time as stage 850, slightly earlier or slightly later.

According to some preferred implementations of the invention, a bridge will make a predetermined action if the following conditions arise: the bridge receives a Reflection Vector for Owning MSTI 1 on an Regional Alternate Port for MSTI 1 that has the same Root Path Cost as the Regional Root Port for MSTI 1, that received Reflection Vector contains a "Yes" for Bit MSTI 2, and MSTI 1's Root Bridge ID (or alternatively, its MSTID) is worse than Root 2's. If these conditions exist, then the bridge selects that Regional Alternate Port as the Regional Root Port for MSTI 1.

Let us apply this rule set to the example now being described with reference to FIG. 8. Bridges A and I have no Alternate Ports of equal cost to their Root Ports, so cannot do anything. Bridge B, which is the bridge that determines the root port for MSTI A, knows A is better than I. Therefore, bridge B does nothing. Only Bridge E, which is the bridge that has a choice for the path used for MSTI I, meets all the criteria.

Figure 9:
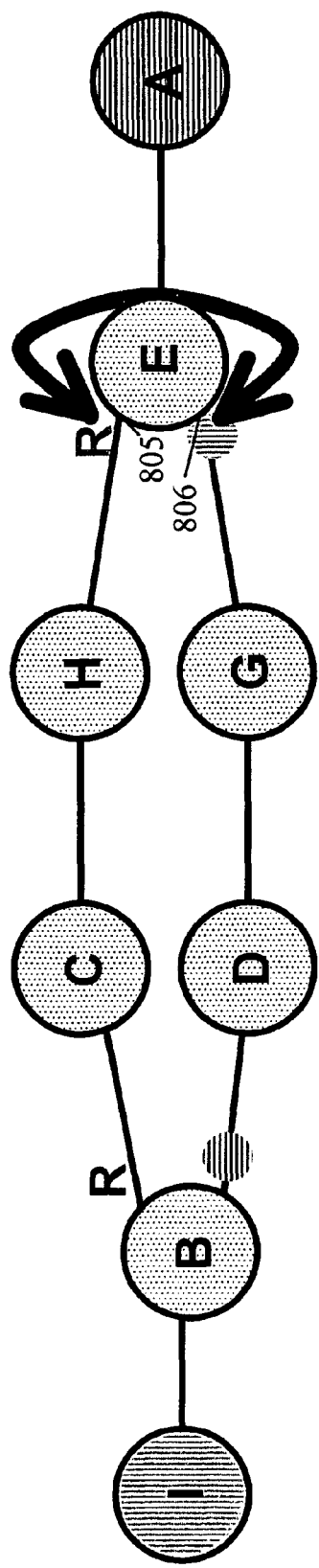
FIG. 9 is a network diagram that illustrates the use of reflection vectors according to some implementations of the invention.
Figure 10:
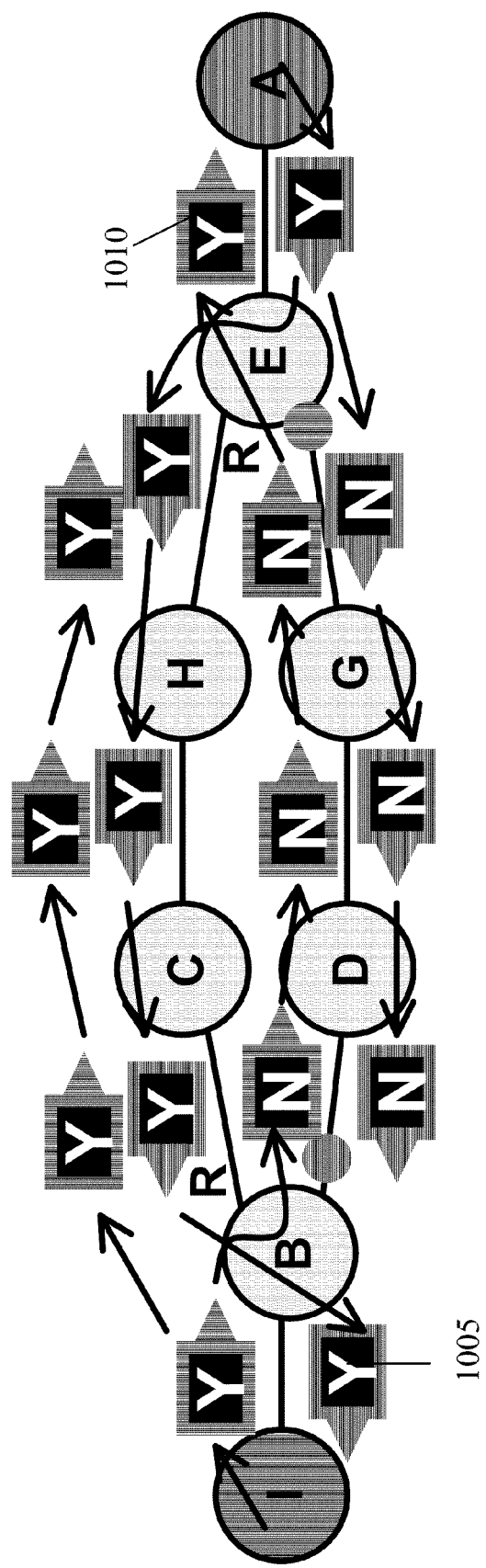
FIG. 10 is a network diagram that illustrates the use of reflection vectors according to some implementations of the invention.

Accordingly, as shown in FIG. 9, bridge E selects a new Root Port from among its Alternate Ports. Here, bridge E blocks port 806 and selects port 805 as the new Root Port for MSTI I.

Bridge E then advertises its decision, i.e. changes the bits for MSTI I in all of the Reflection Vectors for which ports 805 or 806 are Designated Ports. As shown in FIG. 10, Reflection Vectors 1005 and 1010 inform bridge A and bridge I that MSTI A and MSTI I are now in synch.

This implementation of the Reflection Vector brings home the point that defining a Reflection Vector is an "o(n$^2$)" problem, because both sources and destinations must be taken into account. Accordingly, such implementations can potentially require a lot of bits to fully define a Reflection Vector. In fact, a BPDU that carries information for the maximum number of MSTIs allowed by IEEE 802.1Q, 64, would have to be larger than the maximum frame size (1518 octets) in order to contain all 64 Reflection Vectors, each with 64 bits, as well as carrying at least one Port Path Cost.

Therefore, some implementations of the invention provide for a shortened Reflection Vector. For example, if the Reflection Vectors are not used to prune the distribution of multicasts, as described below, but only to ensure that MAC address learning works, then a Reflection Vector need not contain bits corresponding to Bit MSTIs that are worse than (in the sense of IEEE 802.1Q priority vector comparisons) the Owning MSTI. This reduction allows a BPDU carrying the information for 64 MSTIs to fit in a single frame.

In an alternate implementation, instead of tagging each untagged frame with a Root Part 515 indicating the source bridge's MSTI, the frame can be tagged with the destination bridge's MSTI, instead. This technique is called, "destination tagging", as opposed to the "source tagging" so far described. The advantage of destination tagging is that each bridge along the path to the destination bridge may transmit the frame through either the Regional Root Port or a Regional Alternate Port for the destination bridge's MSTI, thus adding a load-sharing capability that can make fuller use of the bandwidth available on all LANs. In order to use destination tagging, however, certain conditions must be met: 1) the identity of the destination bridge must be known to the bridge inserting the tag; and either 2a) the selection of frames transmitted through the Root and Alternate ports must be made in such a way that the utility of learning MAC addresses is not compromised, or 2b) MAC addresses must not be learned in the network. We address these criteria separately.

Universal MAC addresses (as defined by IEEE Std. 802) are normally assigned by the manufacturer of a station or bridge, rather than by the administrator of the network in which those devices participate. If, instead of this universal MAC address, a station used a Local MAC address, selected by the network administrator and containing embedded within it the identity (e.g. the MSTID) of the bridge to which the station is attached, then every MAC address would automatically identify the destination bridge, and criterion 1, above, would be satisfied. However, because a station knows its own universal MAC address and may insert that address into any number of protocols, and because no mechanism currently exists to inform a station that it should change its MAC address, it is not feasible to use Local MAC addresses for stations, and criterion 1 cannot be met.

Therefore, some implementations use a technique, called "MAC-in-MAC," that allows local MAC addresses to be used, and thus allows the identification of the destination bridge for any given destination MAC address. U.S. patent application Ser. No. 11/152,991, filed Jun. 14, 2005 and entitled "Forwarding Table Reduction and Multipath Network Forwarding" and IEEE standard 802.1AH describe relevant information and are hereby incorporated by reference for all purposes. An exemplary format of a MAC-in-MAC frame will now be described with reference to FIGS. 4A and 4B.

Figure 4:
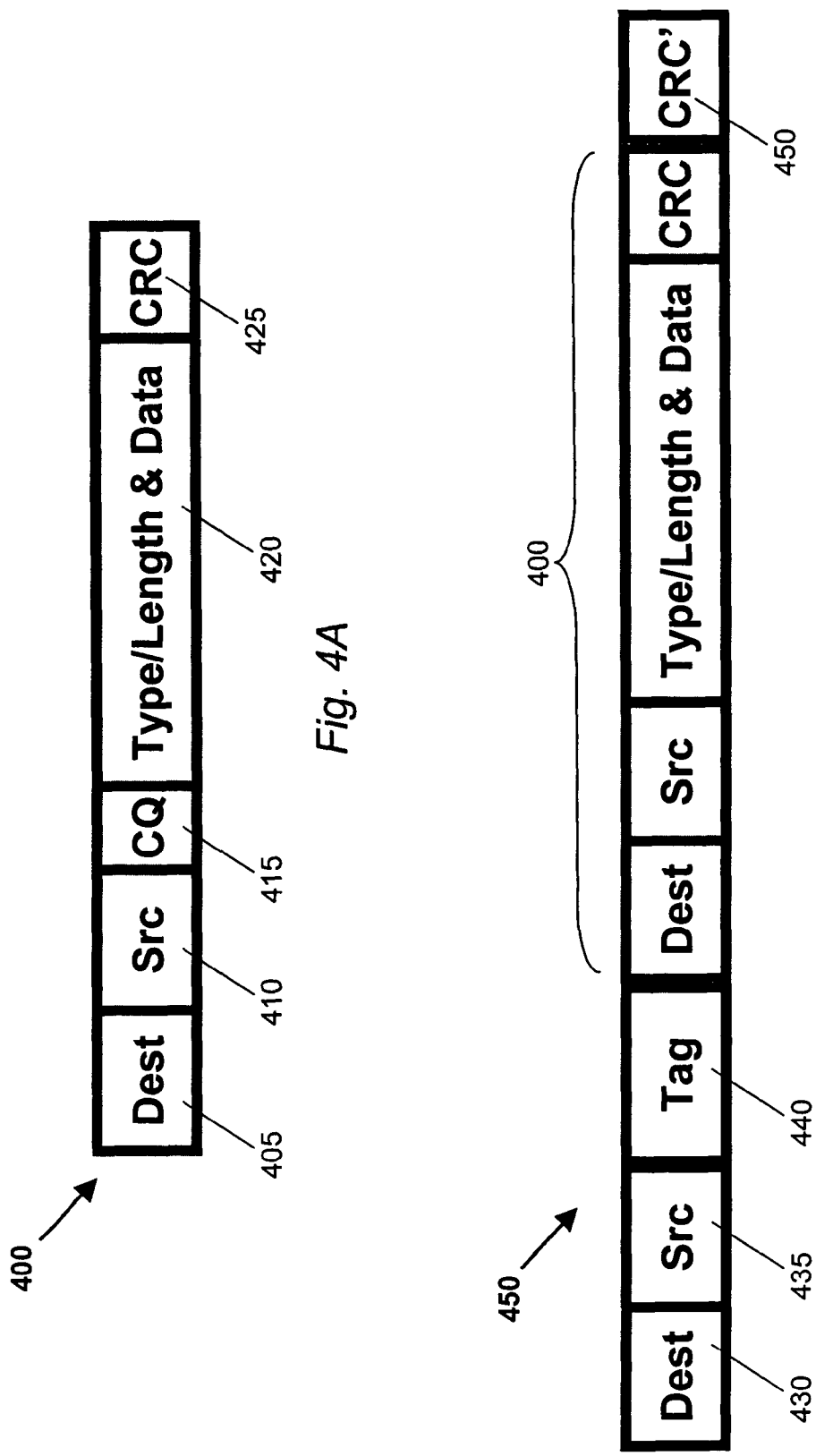
FIG. 4A is a simple Ethernet frame.
FIG. 4B is a MAC-in-MAC frame.

In this example, access ports use simple Ethernet frames, such as depicted in FIG. 4A. Ethernet frame 400 includes destination MAC address 405, source MAC address 410 and the original VLAN tag of the frame (CQ) field 415. CQ field 415 may or may not be present. It may be used to derive the Tag 440 in the translated frame 450, and vice versa, but it is removed from the frame 400 before that frame is encapsulated into the MAC-in-MAC frame 450. For the sake of simplicity, the fields indicating the type, length and data payload are shown as a single field 420. In the normal fashion, the last field of frame 400 is CRC field 425.

In preferred implementations of the invention, each Ethernet frame 400 is encapsulated in a MAC-in-MAC frame 450 by a MAC Tunneling Protocol (MTP) unit. Each MTP unit has its own MAC address. The outer MAC destination and source addresses (indicated in fields 430 and 435, respectively) reference single MTP units (unicast MAC address) or multiple MTP units (multicast MAC address). For example, in network 200, the MTP units would include bridges A through I. Accordingly, in this example, fields 430 and 435 would indicate the identity of the source and destination bridges.

In alternative implementations, there are multiple MTP units per bridge. In some such implementations, there are one or more MTP units per line card. Implementations that provide for assigning multiple MTP units per bridge are discussed below. Moreover, in some implementations MTP addresses are not the only MAC addresses on the backbone.

Field 440 is reserved for a VLAN tag. Some options for implementing VLAN tag 440 are discussed elsewhere herein with reference to FIG. 5 et seq. Frame 450 ends with a CRC field 450 that applies to the outer MAC layer.

Since the addresses of all MTP units are Local MAC addresses, and since these addresses have the identity of bridge in which the MTP units reside embedded within them, no learning of MAC addresses need be performed in that portion of the network that carries the MAC-in-MAC frames. Thus, both criteria 1) and 2a), above, are met, and load balancing of unicast frames can be performed.

As noted above, in some implementations of the invention a bridge will have more than one MAC-in-MAC translation unit ("MTU"). Each MTU needs its own MAC address. Some implementations of the invention fulfill this requirement by using hierarchical MAC addresses. However, such implementations require that the high-order part of the MAC address must be assigned. Accordingly, such implementations lack a "plug-and-play" capability. Therefore, in some preferred implementations of the invention, the MTP units use universal MAC addresses, and each bridge sends Announcement Packets advertising all of the MAC addresses of all of its MTP units.

Announcement Packets also include any multicast addresses wanted by its locally-attached access ports. Such access ports include ports attached to any device that does not implement the methods of the present invention, e.g., end stations and legacy bridges. These "wants" can be expressed via configuration, IEEE 802.1Q General Attribute Registration Protocol (GARP), Multicast Registration Protocol (GMRP), IETF RFC 2236 Internet Group Management Protocol (IGMP), etc. In some preferred implementations, the Announcement Packets tell, for each bridge, which {Multicast Address, Domain Part} pairs the bridge needs to receive to satisfy its locally-connected access ports. Announcement Packets also include the list of VLANs' Domain Parts required by locally-attached access ports. Again, these may be known via configuration, IEEE 802.1Q GARP VLAN Registration Protocol (GVRP), etc.

Announcement Packets are preferably simple multicasts, addressed to the "all Bridges" multicast address. As noted above, these multicasts will be sent along the sending bridge's MSTI. An Announcement Packet is an ordinary multicast; it is not passed hop-by-hop. The information is kept in every receiving Bridge. This information replaces the use of GMRP or IGMP for multicast information, and GVRP for VLAN information.

Every Bridge installs the unicast MAC-in-MAC unit addresses, as well as the sending Bridge's MAC address, in its filtering database. The destination port for each MAC address is determined by the MSTI owned by that destination Bridge. Accordingly, any MAC-in-MAC frame sent to any of these addresses will be sent along the proper MSTI.

Using the Reflection Vector information, a given bridge B knows whether any given port is on the path from bridge A to bridge C.

If, in Bridge B, a Port is sending C's bit in A's Reflection Vector and receiving A's bit in C's Reflection Vector, then that port is on the path from A to C (and vice-versa). Bridge B uses its knowledge of its position along the path from bridge A to bridge C to program its Group Filtering Database for multicasts on bridge A MSTI(s) that are (or are not) wanted by bridge C.

Using this information, the multicast MAC addresses can also installed in Bridge B's filtering database. For example, referring again to network 200, for each multicast MAC address wanted by bridge C on Domain Part 1, the Bridge B enables that multicast MAC address on every VLAN ID included in Domain Part 1 on the Root port for MSTI A. Similarly, the GVRP VLAN filter is set to pass traffic for the VLAN list received from Bridge A on the Root port for MSTI A. This method eliminates the separate multicast route computation of routing schemes. Moreover, this method eliminates the separate multicast/VLAN pruning GVRP/GMRP of 802.1Q.

The Announcement Packets preferably contain information that does not change when the backbone topology changes. Only the application of this information to specific ports on each bridge changes when the topology changes. Thus, the pruning of multicast and VLAN distribution is recomputed at the same time spanning tree topology changes occur, without running a separate protocol (GMRP, GVRP, or IGMP) after the spanning tree topology converges.

Compared to the existing IEEE 802.1Q MSTP standard, the existence of an MSTI per bridge results in the multiplication of the amount of multicast distribution information by the number of bridges in the network. This is because the decision made by Bridge B whether or not to forward a multicast towards Bridge C on MSTI C's Root Port depends on which spanning tree the multicast frame is carried on. Since we have multiplied the number of spanning trees on which multicasts are transmitted by the number of bridges in the network, we have also multiplied the amount multicast state required to distribute those multicasts to only those bridges that want them.

To summarize the foregoing, the following control plane changes to IEEE 802.1Q MSTP are required in order to implement preferred aspects of the invention: MSTIs are associated with bridges, not VLANs; path costs are made symmetrical; a Reflection Vector is implemented to resolve asymmetrical MSTIs; and hop-by-hop GARP is replaced by multicast Announcement Packets. One data plane change is required, which is to use both source MAC address and destination MAC address to find the index for a multicast frame.

However, some aspects of the invention provide specific and more detailed modifications to IEEE 802.1Q. The implementation details and limitations described below do not apply to all implementations of the invention. Accordingly, these details and limitations should not be used to infer limitations regarding the more broadly stated aspects of the invention described herein. Some such implementations enable the computation of up to 4094 multiple spanning tree instances (MSTIs) with the property that, for every pair of MSTIs, the path between their MSTI Regional Roots is the same along both MSTIs.

Modifications to IEEE 802.1Q According to Some Preferred Implementations

The following definitions are provided in order to state clearly the modifications to IEEE 802.1Q according to some preferred implementations of the invention:

Bit MSTI: Within a Reflection Vector transmitted for an Owning MSTI, each bit corresponds to one of the MSTIs known to the transmitting Bridge, the Bit MSTI.

MSTI Table: This is the new name for the MST Configuration Table defined in IEEE 802.1Q.

obMSTP: Optimal Bridging MSTP, which is a shorthand form of referencing some of the methods described herein.

Owning MSTI: For each MSTI, a Reflection Vector is transmitted. The MSTI for which the Reflection Vector is transmitted is the Owning MSTI.

Reflection Vector: A per-MSTI (the "Owning MSTI") bit vector with one bit per MSTI (the "Bit MSTI") known to the sender, including the Owning MSTI. A bit is set to 1 if all of the Bridge Ports along the path from the Owning MSTI's Regional Root, including the Bridge Port on which the Reflection Vector is transmitted, are an MSTI Root Port for the Bit MSTI; otherwise it is set to 0.

SVL Group: A number of VLANs, 0 or more, sharing the same Filtering Database.

SVL Group Table: An array of 4096 2-octet integers added to the MST Configuration Table. This is based on the VID to FID allocation table in Clause 12.10.3 of IEEE 802.1Q.

SVL Groups and the MST Configuration Table

The 4096-integer MST Configuration table defined in IEEE 802.1Q is redesignated the "MSTI Table". An additional SVL Group Table of 4096 2-octet integers is appended to the end of the MSTI Table to form the new MST Configuration Table. Each integer in the SVL Group Table corresponds to one VLAN ID, and assigns that VID to a specific Filtering Database ID (FID). The SVL Group Table is, therefore, simply a normalization of the VID to FID allocation table described in Clause 12.10.3 of IEEE 802.1Q. The CIST, which corresponds to VID 0 in the SVL Group Table, is always assigned to FID 0.

The computation of the Configuration Digest of IEEE 802.1Q is modified to include both the MSTI Table and the SVL Group Table. To absolutely ensure correct operation between obMSTP Bridges and standard MSTP Bridges (those adhering strictly to IEEE 802.1Q) even in the unlikely event of a Configuration Digest collision, the Configuration Name of obMSTP Bridges should be different than the Configuration Name of any MSTP Bridges to which they might become connected. All spanning tree instances that share the same FID value are made commutative by the methods described herein.

The section numbers referenced below correspond to the section numbers of IEEE 802.1Q.

3.2 obMSTP BPDU Validation

In addition to the checks defined in Clause 14.4 of IEEE 802.1Q, an obMSTP is recognized by:

f. If the Protocol Identifier is 0000 0000 0000 0000, the Protocol Version Identifier is 4 or greater, and the BPDU Type is 0000 0010, and the BPDU:

1. contains 108 or more octets; and
2. a Version 1 Length of 0; and
3. a Version 3 length representing an integral number, from 0 to 64 inclusive, of both MSTI Configuration Messages and obMSTP Configuration Messages; and
4. a Version 4 length representing the number of Port Path Costs which equals the Version 4 length being used on this port for transmitting BPDUs; it shall be decoded as an obMSTP BPDU.

3.3 Additional Per-Bridge Variables

One instance of the following variable is maintained for each MSTI by an obMSTP Bridge, indexed by MSTID:

MstiReflectionVector. The reflection vector last received from the MSTI Root Port. If this is the MSTI Root Bridge, the MstiReflectionVector contains a 1 in every bit position for every MSTI instantiated on the Bridge that has the same FID value as this MSTI's FID. The appropriate MstiReflectionVector is updated every time the MSTI Root Port changes, and every time a new value is transmitted from the MSTI Designated Bridge on the MSTI Root Port.

3.4 Additional Per-Port Variables

One instance of each of the following variables is maintained for each MSTI by an obMSTP Bridge, indexed by MSTID:

mstiReflectionVector. The reflection vector last received from (or transmitted from, if this is the Designated Bridge for this MSTI) the MSTI Designated Bridge on this Port. If this is the MSTI Designated Bridge then the mstiReflectionVector is formed by taking the MstiReflectionVector and clearing the bit corresponding to each MSTI, assigned the same FID as this MSTI, for which this same port is not in the Root Port role.

mstiPortPathCost. The Port Path Cost last received from (or transmitted from, if this is the Designated Bridge for this MSTI) the MSTI Designated Bridge on this Port. The value is set to the configured Internal Port Path Cost for this MSTI, if this is the MSTI Designated Bridge.

mstiClaimantID. The lowest numerical MSTID which is assigned the same FID as this MSTI and whose mstiReflectionVector contains a 1 in the bit position corresponding to the index (MSTID) of this variable. If this value is numerically higher than the variable's index, the index is used, instead. Note that the reception of a Reflection Vector for any MSTI on a port may affect the mstiClaimantID for any number of other MSTIs on the port, and thus require a recalculation for that MSTI.

Throughout the obMSTP spanning tree calculations, the mstiPortPathCost, instead of the configured Port Path Cost, is used. Thus, the Port Path Cost is determined by the MSTI Designated Bridge, and is the same in all directions through the LAN.

3.6 Configuration Restrictions

Every Port Path Cost (mstiPortPathCost) for every MSTI on a given port that shares the same FID value (according to the SVL Group Table) must be equal. Changing the Port Path Cost on one MSTI on one Port changes the Port Path Costs (mstiPortPathCosts) for all MSTIs on that Port that have the same FID value. Every MSTI Bridge Priority for every MSTI that shares the same FID value (according to the SVL Group Table) must be equal. Changing the MSTI Bridge Priority on one MSTI changes the MSTI Bridge Priorities for all MSTIs that have the same FID value.

3.7 Reflection Vector Creation and Propagation

The Reflection Vector transmitted for each MSTI on each port is computed according to the definitions of the MstiReflectionVector and mstiReflectionVector variables when the bridge is an MSTI Designated Bridge for that MSTI. The MstiReflectionVector and mstiReflectionVector variables are altered according to those same definitions when a Reflection Vector is received for an MSTI on the port.

3.8 Modified Priority Vectors

The priority vectors defined in Clauses 13.9 and 13.11 of IEEE 802.1Q are modified as follows: 1. An additional component of an MSTI priority vector is added between items i) and j) of Clause 13.9: a MSTI Claimant ID, the most superior MSTID that prefers this port be an MSTI Root Port. 2. Clause 13.11 is modified to insert the mstiClaimantID between the IntRootPathCost and Designated-BridgeID in every vector and calculation.

3.9 BPDU Format

The BPDU format described in Clause 14 of IEEE 802.1Q is extended and altered as follows:

1. The Protocol Version number is 4, instead of 3.
2. Immediately following the MSTI Configuration Messages is a 2-octet Version 4 length containing the number of Port Path Costs included in the BPDU.
3. Immediately following the Version 4 length is a table of 4-octet integers, each containing the Port Path Cost, as configured on this Bridge Port, for one of the FIDs in the SVL Group Table that have corresponding MSTIDs in the MSTP Configuration Messages. The CIST FID, FID 0, is always represented as the first Port Path Cost. The remaining Port Path Costs are in the numerical order of the FID values in the SVL Group Table, the Port Path Cost for the lowest FID first.

4. Immediately following the Port Path Costs are the number of obMSTP Configuration Messages specified in the Version 3 length. Each obMSTP Configuration Message corresponds to the MSTP Configuration Message in the Version 3 segment of the BPDU; the first obMSTP Configuration Message contains additional information for the MSTI encoded in the first MSTP Configuration Message, the second contains additional information for the second MSTI in the Version 3 segment, etc. The obMSTP Configuration Message contains only a Reflection Vector. The length of each Reflection Vector in octets is the minimum number required to contain one bit for each MSTI with the same FID as the MSTI of the MSTP Configuration Message. Thus, if 16 MSTIs share the same FID as the MSTI of the obMSTP Configuration Message, then the Reflection Vector is 2 octets in length, while 17 MSTIs on the same FID would require a 3-octet Reflection Vector. The most significant bit of the first octet of the Reflection Vector corresponds to the first MSTI in the Version 3 segment, and so on. There is no MSTP Message, and hence no Reflection Vector, transmitted for MSTI 0, the CIST.

5. It is possible that the configuration of the Bridge is such that the Version 4 information overflows the maximum size of a BPDU. In that case, the Bridge must be reconfigured, either with fewer MSTIs, or fewer MSTIs in each SVL Group, in order to get the BPDU size within allowable limits.

Alternatively, more than one BPDU can be transmitted, with each BPDU containing information for additional MSTIs. Note that the wording of point 3, above, is carefully chosen so that only Port Path Costs relevant to the set of MSTIDs represented by the MSTP Configuration messages in this BPDU are carried in the BPDU.

One may note that, for 64 MSTIs, with 32 MSTIs assigned to each of two FIDs, the size of the PDU is:

102(base)+2(v4 length)+8(port path costs)+64*16 (MSTP Messages)+64*4(Reflection Vectors)= 1392

This fits into a single frame. On the other hand, if all 64 MSTIs are assigned to the same FID, we generate:

102(base)+2(v4 length)+4(port path cost)+64*16 (MSTP Messages)+64*8(Reflection Vectors)= 1644

This does not fit into a single maximum-length frame. If the Multiple Registration Protocol (see IEEE Project 802.1ak, "Multiple Registration Protocol," which is hereby incorporated by reference) is used to distribute multicast address and VLAN registrations, instead of the technique given in Section 4.0, then no MSTP Message need contain information about inferior (higher numbered) MSTI IDs in its Reflection Vector. In that case, the first MSTI needs no Reflection Vector, the next eight MSTIs need only a single octet each to hold their Reflection Vectors, the following eight need only two octets, etc., for a total of 8(8+1)/2*8−8=280 octets. The total requirement for 64 MSTIs is then:

102(base)+2(v4 length)+8(port path costs)+64*16 (MSTP Messages)+280(Reflection Vectors)= 1412

This computation is presented as an alternative.

3.10 Convergence Time

The worst case for the convergence of MSTP (not counting the "counting to infinity" problem, wherein stale and current data chase each other around a physical loop in the network) is when an MSTI Regional Root positioned at the edge of a network quietly expires, and the best backup MSTI Regional Root is on the opposite side of the network. MSTP converges in two passes across the network in this case. In pass one, the loss of the MSTI Regional Root is propagated across the network to the new MSTI Regional Root, and in pass two, that new MSTI Regional Root's information is propagated back across the network.

For obMSTP, this sequence is unchanged for the lowest-numbered MSTI (let us assume that this is MSTI 0). This is because the mstiClaimantID used in the priority vectors for MSTI 0 is unaffected by the Reflection Vectors; the MSTI's own ID (0) is always better than any other MSTI's ID. However, the next-higher numbered MSTI (let us assume that this is MSTI 1) can require one extra pass of information across the network before it converges.

This is because, if the MSTI Regional Root of MSTI 1 is near the original failed MSTI 0 Regional Root, then when the information from the new MSTI 0 Regional Root reaches the MSTI 1 Regional Root, MSTI 0's Reflection Vector may cause MSTI 1 to switch its MSTI Regional Root Port. Only MSTI 0's Reflection Vector can affect MSTI 1. In the worst case, where the even-numbered MSTIs are on one side of the network and the odd-numbered MSTIs are on the other side, it is possible (though unlikely) that each additional MSTI requires an additional propagation pass of information across the network to reach convergence. Thus, an obMSTP network with n MSTIs can require take (n+1) passes across the network in order to converge. Placing the highest priority (lowest numbered) MSTI Regional Roots towards the center of the network is the easiest way to prevent this "sloshing."

Multicast Distribution and VLAN Pruning

The knowledge gained through the Reflection Vector enables bridges to dispense with the GVRP and GMRP protocols for computing the range of distribution of multicasts, broadcasts, and unknown unicasts. We assume in this section (until further notice) that there is one MSTI rooted in each Bridge for each FID value. By some unspecified means other than the BPDUs, e.g. GVRP, GMRP, IGMP, or by configuration, each Bridge acquires a list of all of the VLANs and/or {VLAN, Multicast MAC address} pairs (called Groups) that are required to be delivered to any given Bridge. The means used to distribute this information could include, but is not limited to, the following: a flood protocol such as Cisco's VTP; an OSPF-like state distribution protocol; or a series broadcast (or multicast) frame transmitted by each Bridge to advertise its requirements.

Assuming that there is one MSTI assigned each Bridge on a given FID, the list of VLANs and Groups needed by a particular Bridge is equivalent to the list of VLANs and Groups needed by a particular MSTI Root Bridge. If a port is an MSTI Designated Port for MSTID x, then for each VLAN and Group assigned to this MSTI (note that the Group includes a VLAN, and every VLAN maps to both an MSTI and a FID), that VLAN or Group need be transmitted on the Port only if a bit y is set in the MSTID x Reflection Vector transmitted on that Port that corresponds to the MSTID y of some Bridge requiring that VLAN or Group.

In other words, a VLAN or Group on MSTI x need be transmitted only if this is the MSTI Root Port, on some other MSTI y in the same FID, where y corresponds to a Bridge that requires the VLAN or Group. If a port is an MSTI Root Port, then for each VLAN and Group assigned to this MSTID x, that VLAN or Group need be transmitted on the Port only if the bit x corresponding to this MSTID x is set in some MSTI y Reflection Vector received on that Port (of course, this Bridge is an MSTI Root Port on that MSTI, also), where y corresponds to a Bridge that requires the VLAN or Group.

In other words, the VLAN or Group need be transmitted on MSTID x only if Bridge that requires the VLAN or Group is the Designated Bridge on some MSTID y that finds this LAN the path towards MSTID x's MSTI Root Bridge.

Since the list of VLANs and/or Groups needed by a given Bridge changes at completely different times and for completely different reasons than the spanning tree instances change, this divorcing of the propagation of the VLAN and Group requirements results in the VLAN and Group propagation information converging at the same moment that the spanning trees converge. Of course, the Reflection Vector propagation can slow the convergence of the highest numerically numbered MSTID, but proper assignment of MSTIDs to brides, taking into account the topology of the network, can reduce or even eliminate this problem. In particular, assigning low-numbered MSTIDs to bridges at the center of the network prevents delayed convergence of the MSTIs.

Multiple Bridges can be assigned to the same MSTID. In that case, Bridges should forward all VLANs and all Groups towards other Bridges sharing the same MSTID. Other than that, all of the rules in this section can be followed, and GVRP/GMRP can still be eliminated.

Platform Requirements

To make the most effective use of this protocol, a platform needs to have certain capabilities:

1. A programmable per-port per-VLAN mask is needed to specify which VLANs are transmitted without a VLAN tag on which ports. This capability is specified in IEEE Std. 802.1Q. Some platforms are limited, at present, to transmitting only one VLAN untagged, if many VLANs are permitted to exit the port. This enables VLAN tags with different R and M parts, but the same D part, to all be output untagged to a non-VLAN-aware end station.

2. Either a 12-bit Port VLAN Mask should be configured per port, said mask being ANDed with the VLAN ID transmitted on each tagged frame on that port, or a full 4096×12-bit VLAN ID translation needs to be applied on every VLAN-tagged frame output from the port. This enables the D and M parts of the VLAN tag to be suppressed when communicating with a VLAN-aware end station.

3. Either the 12-bit Port VLAN Mask defined in point 2, above, needs to be used when applying the Port VLAN Identifier (PVID) on incoming frames, or a full 4096×12-bit VLAN ID translation needs to be applied on every VLAN-tagged frame input to the port.

This mask is used as:

$$\text{VLAN}=((\text{VLAN ID from tag}) \wedge (\text{Port VLAN Mask})) \vee (\text{PVID} \wedge \neg (\text{Port VLAN Mask})) \quad (1)$$

This enables the D and M parts to be applied when receiving a frame from a VLAN-aware end station. As a workaround, the end station (perhaps a router, perhaps a router imbedded in the same chassis as the bridge) can ignore the D and M parts of the VLAN ID when receiving a frame, and always transmit appropriate D and M values. In other words, the port mask, PVID application, and/or VLAN ID translation can be performed on either end of a point-to-point connection between the bridge and a VLAN-aware end station.

Figure 11:
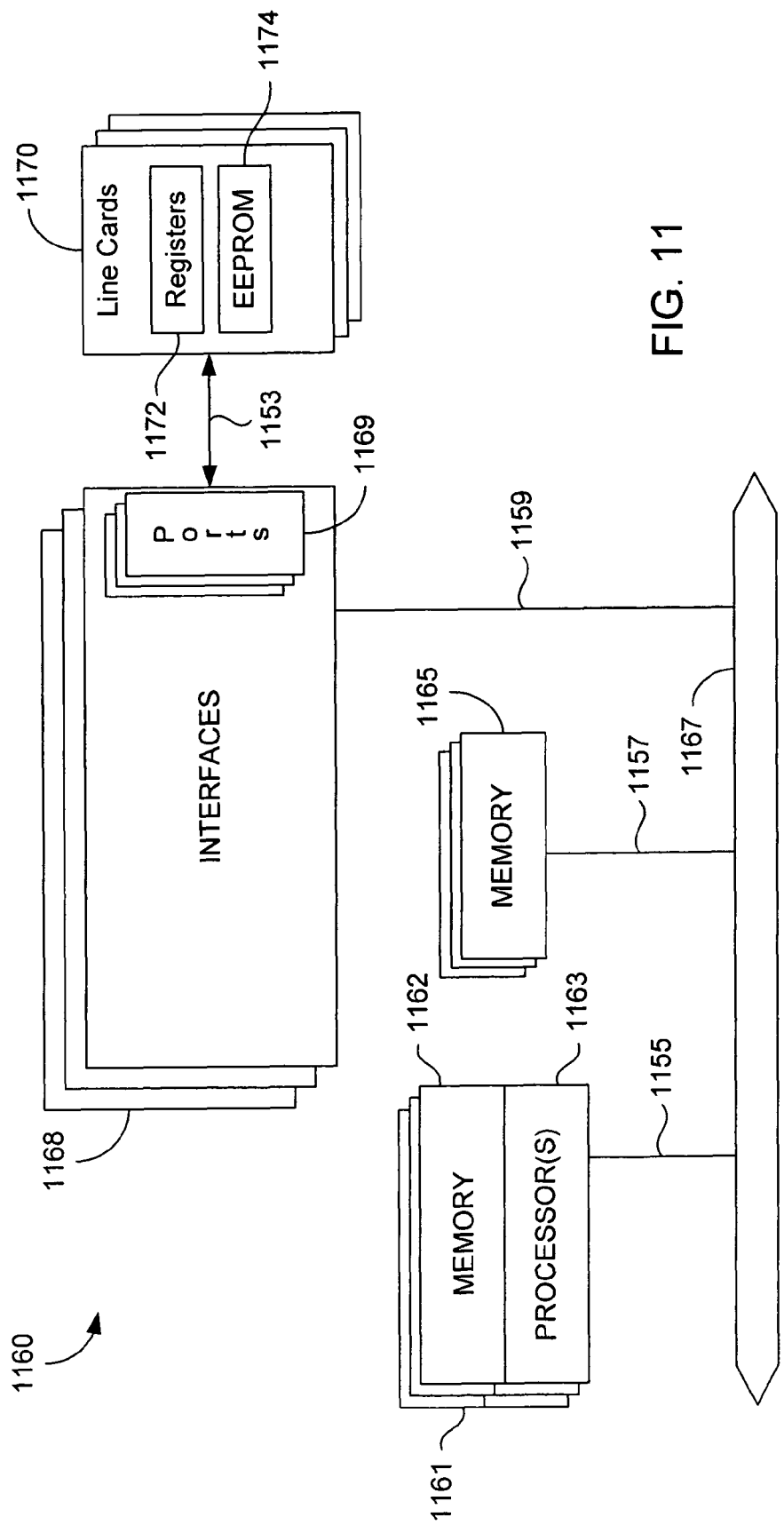
FIG. 11 is a block diagram of a network device that can be configured to perform some methods of the invention.

FIG. 11 illustrates an example of a network device that may be configured to implement some methods of the present invention. In some embodiments, network device 1160 is a Catalyst™ switch provided by Cisco Systems, Inc. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor 1174 and, in some instances, volatile RAM. Independent processors 1174 may be, for example ASICs or any other appropriate processors. According to some such embodiments, these independent processors 1174 perform at least some of the functions of the logic described herein. In some embodiments, one or more of interfaces 1168 control such communications-intensive tasks as media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "line cards"). Generally, interfaces 1168 control the sending and receiving of data packets over the network and sometimes support other peripherals used with the network device 1160. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system (e.g. Linux, VxWorks, etc.), and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 11) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

I claim:

1. A method of controlling a network having a plurality of bridges, the method comprising:
configuring a bridge in a region of the network as a root of a respective Multiple Spanning Tree Instance ("MSTI") after such bridge receives one or more frames from a device that does not specify another root or another MSTI; and
sending from the bridge unicast frames according to an MSTI having another receiving bridge as a root bridge;
wherein a field of the unicast frames has one bit for each MSTI of the region; and
resetting at the bridge a bit of the field of the unicast frames sent from the bridge and such bit being reset for an individual MSTI to "No" whenever another unicast frame is received on a port of the bridge that is not a root port of the individual MSTI.

2. The method of claim 1, further comprising sending multicast frames according to an MSTI having a sending bridge as a root bridge.

3. The method of claim 1, wherein access ports use simple Ethernet frames.

4. The method of claim 1, wherein the unicast frames are MAC-in-MAC frames.

5. The method of claim 4, wherein each MAC-in-MAC frame comprises a simple Ethernet frame encapsulated by an encapsulation layer having a bridge ID as a destination MAC address.

6. The method of claim 5, wherein the encapsulation layer comprises a VLAN tag.

7. The method of claim 6, wherein the VLAN tag indicates a root bridge of an MSTI.

8. The method of claim 6, wherein the VLAN tag comprises a Root Part, a Multipath Part and a Domain Part.

9. The method of claim 1, wherein a bridge in the region includes more than one MAC-in-MAC translation unit ("MTU"), each MTU having a MAC address, further comprising the step of sending from the bridge an announcement packet advertising the MAC address of the bridge's MTUs.

10. The method of claim 1, wherein the network comprises a plurality of MAC-in-MAC translation units ("MTUs"), the method further comprising:
at a first one of the plurality bridges, receiving a simple Ethernet frame by a first MTU;
at the first bridge, encapsulating the simple Ethernet frame as a MAC-in-MAC frame that indicates at least a destination bridge ID and a second MSTI; and
from the first bridge, forwarding the MAC-in-MAC frame according to the second MSTI.

11. The method of claim 10, further comprising:
at a second bridge, receiving the MAC-in-MAC frame by a second MTU;
at the second bridge, decapsulating the MAC-in-MAC frame to reveal the simple Ethernet frame; and
from the second bridge, sending the simple Ethernet frame to an access port.

12. The method of claim 1, wherein the operation for configuring, sending, and resetting are repeated for each bridge.

13. A method of controlling a network, comprising:
at a first bridge of the network, forming a field of a first frame having one bit for each Multiple Spanning Tree Instance ("MSTI") of a region including an individual MSTI of the first bridge; and
at the first bridge, after receiving a second frame, setting a bit of a field of the second frame that corresponds to the individual MSTI to "No" if the second frame was passed from a second bridge through a port of the first bridge that is not a root port of the individual MSTI.

14. The method of claim 13, further comprising:
at the first bridge of the network, receiving a third frame having a bit of a field set to "No"; and
at the first bridge, applying a protocol to determine which bridge will select a new root port.

15. A network apportioned into a plurality of regions, the network comprising a plurality of bridges in a region of the network, a bridge configured as a root of a respective Multiple Spanning Tree Instance ("MSTI") after the bridge receives one or more frames from a device that does not specify a root or a MSTI for such device and the bridge is further configured to send unicast frames according to an MSTI having another receiving bridge as a root bridge after the other receiving bridge is configured, the bridge is further configured to form a field of a first unicast frame having one bit for each MSTI of the region, wherein the bridge is further configured to set a bit of the field that corresponds to an individual MSTI to "No" when a second unicast frame is passed through and received by a port of the bridge that is not a root port of the individual MSTI.

16. At least one computer readable storage medium having computer program instructions stored thereon that are arranged to perform the following operations, and wherein the at least one computer readable storage medium includes one or more of a magnetic media, magneto-optical media, or optical media:

at a network device, determining that the network device is in a region of a network;

at the network device, configuring the network device as a root of a first Multiple Spanning Tree Instance ("MSTI") after such network device receives one or more frames from another device that do not specify a root or a MSTI;

from the network device, sending multicast frames according to the first MSTI;

from the network device, sending unicast frames according to a second MSTI, wherein another receiving bridge in the region of the network is a root bridge of the second MSTI, unicast frames having a field containing one bit for each MSTI in the region; and at the network device, changing a bit corresponding to an individual MSTI whenever a unicast frame is received on a port that is not a regional root port of the individual MSTI.

* * * * *